United States Patent

Rogers et al.

[11] Patent Number: 5,527,496
[45] Date of Patent: Jun. 18, 1996

[54] SPRAY HEADER INTEGRATED TRAY

[75] Inventors: Kevin J. Rogers, Wadsworth; Robert B. Myers, Norton; Wadie F. Gohara, Barberton, all of Ohio

[73] Assignee: The Babcock & Wilcox Company, New Orleans, La.

[21] Appl. No.: 424,023

[22] Filed: Apr. 18, 1995

[51] Int. Cl.⁶ .................................................... B01F 3/04
[52] U.S. Cl. ................................... 261/111; 261/113
[58] Field of Search ..................... 261/111, 113

[56] References Cited

U.S. PATENT DOCUMENTS

| 249,528 | 11/1881 | Isbell | 261/113 |
|---|---|---|---|
| 1,748,409 | 2/1930 | Campbell | 261/113 |
| 3,765,659 | 10/1973 | Reilly | 261/113 |
| 4,263,021 | 4/1981 | Downs et al. | 261/113 |
| 4,405,533 | 9/1983 | Norback et al. | 261/113 |

*Primary Examiner*—Tim R. Miles
*Attorney, Agent, or Firm*—Daniel S. Kalka; Robert J. Edwards

[57] ABSTRACT

An integrated spray header tray assembly (18) for a wet flue gas desulfurization spray tower (10) wherein a series of spray headers (22) having opposed nozzles (26) for desulfurizing spray are located along a perforated plate (24) acting as one set of baffles (30) while a second set of baffles (32) positioned perpendicularly thereto forms a baffled tray with the perforated plate (24) and headers (22) while allowing the introduction of desulfurizing spray from the header nozzles (22) parallel to the perforated tray (24).

12 Claims, 3 Drawing Sheets

SPRAY HEADER INTEGRATED TRAY

BACKGROUND OF THE INVENTION

1. Field of the Invention

The present invention relates to flue gas desulfurization (FGD) systems generally and more particularly to wet FGD systems having spray headers and tray zones for desulfurization slurry liquor contact with flue gases.

2. Description of the Related Art

Prior art flue gas desulfurization (FGD) units are either wet or dry scrubber systems which use either solid or liquid desulfurization materials in contact with the flue gas.

A popular wet scrubber design today is the spray tower 10 depicted in FIG. 1. The tower 10 is designed so that, at maximum load, the average superficial gas velocity does not exceed the design gas velocity. For most spray towers, the average gas velocity varies from about 8 to 13 ft/s (2.4 to 4 m/s) based upon scrubber outlet conditions. A typical design velocity for a limestone wet scrubber is about 10 ft/s (3.1 m/s).

The flue gas enters the tower 10 from the side and gas flow nonuniformity is a potential problem. This problem may be eliminated with central or annual gas inlet designs newly implemented by The Babcock & Wilcox Company.

The absorber design depicted in FIG. 1 incorporates a prior art sieve or perforated plate tray assembly 12 which reduces flue gas flow maldistribution. The pressure drop across the tray is typically in the range of 1 to 3 in. $H_2O$ (0.025 to 0.075 kPa). Towers with multiple trays of this design have also been built. The design of the tower and the number of trays is influenced by the reagent (lime or limestone, for example), the desired $SO_2$ removal level, the trade-off between fan power and recirculation slurry pump power, and other process variables.

The dominant design variable for all FGD wet scrubbers is the ratio of slurry flow to gas flow in the tower, known as L/G. In the U.S., this term is expressed as gallons per thousand cubic feet of flue gas evaluated at scrubber outlet conditions. In Japan and Germany, the L/G units are $l/m^3$. A wide range of L/G values have been used on wet scrubbers. Soda scrubbers operate at L/G ratios as low as 10 gal/1000 $ft^3$ (1.34 $l/m^3$) and some limestone scrubbers operate at L/G ratios up to 150 gal/1000 $ft^3$ (20 $l/m^3$).

Spray nozzles 14 are used in wet scrubbers to achieve a surface area contact between slurry with flue gas. The operating pressures typically vary between about 5 and 20 psi (34 and 138 kPa). Spray nozzles without internal obstructions are favored to minimize plugging by debris. Although plugging could be minimized by using a minimum number of large capacity spray nozzles, flow maldistribution would most likely occur. Therefore, a larger quantity of smaller capacity nozzles are usually preferred. Due to the abrasive nature of the slurry solids, the nozzles are manufactured out of ceramic or polymeric material to resist erosion.

The large tank at the bottom of the tower is typically referred to as the reaction tank or the recirculation tank. The volume of this tank permits several chemical and physical processes to approach completion. Some of these time dependant processes will be described in more detail later.

Flue gas enters the side of the scrubber module at a temperature typically within the range of 250° to 350° F. (121° to 177° C.) and is evaporatively cooled to its adiabatic saturation temperature by contact with the slurry. The scrubber inlet must be designed to prevent deposition of slurry solids at the wet-dry interface. Because the inlet flue is at the flue gas temperature [for example 300° F. (149° C.)] and the shell of the scrubber is at the saturation temperature [for example 125° F. (52° C.)], there exists a region where the surface temperature abruptly changes. Deposits are most likely to form in this region. Deposition is minimized by a combination of features which prevent periodic slurry splashing on the hot, dry side of the wet-dry line.

Flue gas passes vertically upward through the scrubber. In the unit illustrated in FIG. 1, the gas flow is uniformly distributed by a perforated plate or sieve tray 16. This tray also serves as a gas-liquid contacting device. Gas-liquid contact is enhanced by a froth of slurry which forms on the tray as the flue gas rises upward.

Above the tray, the flue gas passes through several spray levels to achieve additional gas-liquid contact. Each spray level consists of an array of headers and spray nozzles as shown in FIG. 1. The spray nozzles produce a relatively coarse spray. Typically the suspension of spray droplets is in countercurrent contact with the flue gas for about one to three seconds. A majority of the $SO_2$ absorption occurs during this short contact time. The spray zone in combination with the slurry froth on the tray is referred to as the gas-liquid contact zone of the wet scrubber.

A disengagement height is provided above the top spray zone before the flue gas reaches the mist eliminators. The purpose is to allow disengagement and return via gravitational forces of the largest slurry droplets to the spray zone. For a scrubber operating at an average gas velocity of 10 ft/s (3 m/s), droplets larger than about 600 microns may have sufficient mass to fall back to the spray zone.

Typically chevron type mist eliminators are used in wet scrubbers to capture spray droplets entrained in the flue gas (see FIG. 3). These mist eliminators typically collect slurry deposits by impaction. They efficiently collect droplets larger than about 20 microns in diameter.

The design of the flue from the exit of the wet scrubber to the stack is an important facet of the system design. The potential for severe corrosion and deposition in these flues is well documented. This potential for severe corrosion arises from a combination of facts. First, the flue gas leaves the mist eliminator saturated with water vapor. Second, some carryover of slurry droplets smaller than 20 microns is inevitable. These droplets will usually be slightly acidic and may contain high concentrations of dissolved chlorides. The flue gases will contain some residual $SO_2$ and ample oxygen to oxidize some of the $SO_2$ to $SO_3$. Because the flue gas is saturated with water vapor, surface condensation is inevitable. This condensate can become severely acidic (pH less than 1.0), and calcium salts can deposit on the walls. Two approaches are used to minimize these effects, flue gas reheat and flue/stack lining. The former option involves reheating the flue gas to vaporize entrained droplets. There are various methods for reheating the flue gas that exits the scrubber. Some examples include the following:

1. steam coil heaters;
2. mixing with some hot flue gas which is bypassed around the scrubber;
3. mixing with hot air;
4. mixing with hot gases generated by combustion of a clean fuel; and
5. regenerative heat exchanger which transfers heat from the hot flue gas inlet to the cooler flue gas outlet.

Several problems are associated with each of the reheat methods. Deposition and corrosion occur in the heat exchanger. Reheating with bypass gas reduces the overall FGD system effectiveness. Finally, the evaporation of droplets from the scrubber concentrates the corrosive constituents in the slurry. As a result, operation with out flue gas reheat, (i.e., with a wet stack), has become popular in the U.S. Under these conditions, the flue from the scrubber to the stack is lined with corrosion resistant materials, and the stack is lined with acid resistant brick or other suitable material. A drainage system is also included to accommodate condensation of water vapor.

SUMMARY OF THE INVENTION

The present invention is directed to solving the problems associated with prior art spray towers by providing an integrated tray and spray header for same. The spray headers with associated nozzles are supported on a perforated tray or plate. The tray is in turn supported by a simple set of supports lying along the length of each header and attached to the walls of the tower to locate and support the integrated spray header and tray thereby. The headers lie in spaced parallel relation along the tray and form one set of baffles normally found on trays. Baffles are also located in spaced perpendicular relation to the headers and with them form individual boxed or bounded areas typically found in spray towers that utilize trays.

In view of the foregoing it will be seen that one aspect of the present invention is to provide an integrated header and tray assembly for a wet FGD spray tower.

Another aspect of the invention is to provide an integrated spray header and tray wherein the headers act as tray baffles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 3:
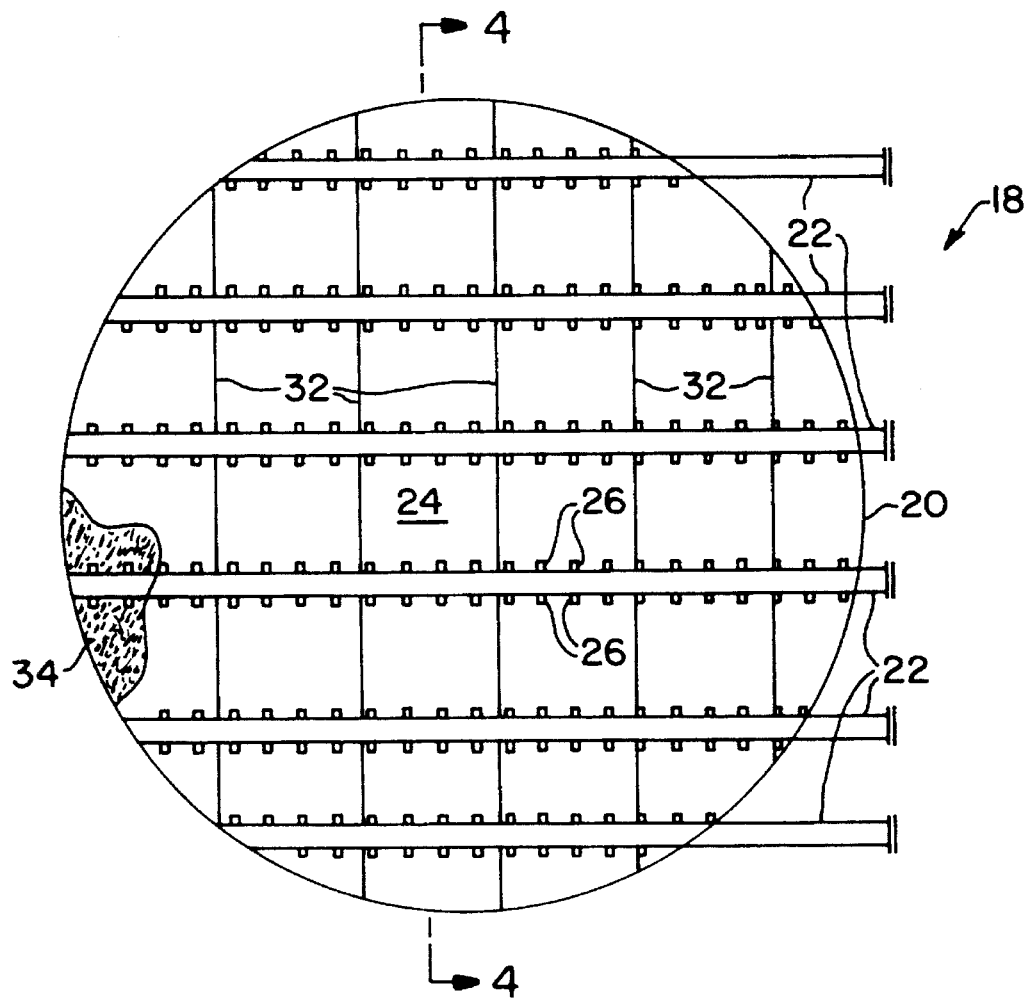
FIG. 3 is a top view of an integrated spray header and baffled tray of the present invention which replaces the separate spray headers and tray shown in FIG. 1.
Figure 4:
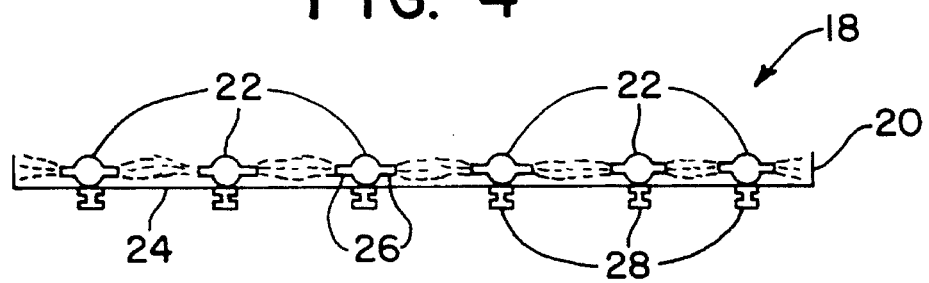
FIG. 4 is a side view of the FIG. 3 integrated spray header and baffled tray of FIG. 3 showing the support members for same.

Referring to the drawings, where like numerals designate like or similar features throughout the several views, and particular reference to FIGS. 3 and 4, there is an integrated tray and spray header assembly 18 which is retrofitted into the spray tower 10 assembly replacing the existing individual tray assembly 12 and header assembly 14. Of course new spray towers could already incorporate the integrated assembly 18.

Figure 6:
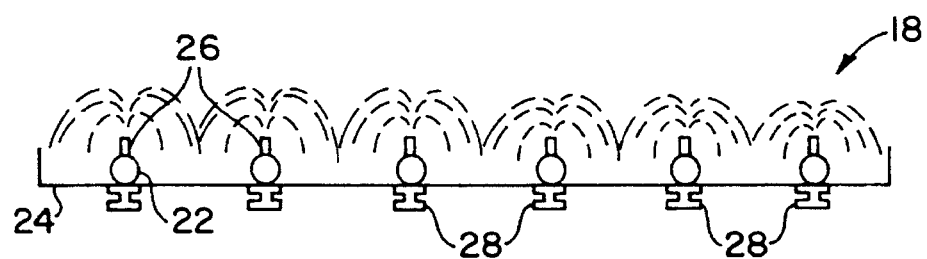
FIG. 6 is a side view of still another embodiment of the present invention.

In the present invention a plurality of headers 22 are extended in a predetermined spacing through the body 20 of the tower 10 to lie on a perforated plate 24 forming a part of the tray. The headers 22 have a plurality of discharge ports 26 such as nipples or nozzles located either on opposing sides as seen in FIG. 4, or at least one oriented substantially perpendicular as seen in FIG. 6 to spray, pour or otherwise introduce desulfurizing slurry or liquid substantially parallel to the plate 24 in a direction substantially perpendicular to flue gas flow. The headers 22 extend through the wall 20 of the tower 10 and form a partial support therefore in a known manner. Further, as best seen in FIG. 4., headers 22 rest on the tray 24 and are supported along with the tray 24 by I beam supports 28 located under the tray 24 which run the length of the headers 22 and which are mounted along the walls 20 of the tower 10 and supported there as will be disclosed later.

Figure 2:
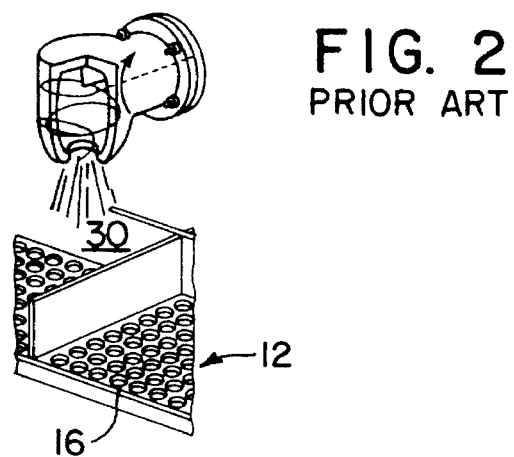
FIG. 2 is an expanded view of the circled section of FIG. 1 showing a section of the prior art tray and baffle assembly with a spray nozzle of the nozzle assembly above same.

The headers 22 are spaced along the tray 24 at locations in a direction, substantially normally to the set of tray baffles 30 as best shown in FIG. 2. The size of the headers 22 allows them to act as one set of baffles for the integrated tray and spray header assembly 18. The assembly 18 further has a set of spaced baffles 32 located perpendicular to the headers 22. These baffles 32 are notched to extend over or under the headers 22 allowing them and the headers 22 to rest directly on the tray 24. Thus, the headers 22 and baffles 32 control the slurry/liquor migration as well as enhance gas distribution and the overall removal performance of acid gases, particulates and/or other contaminants.

Figure 1:
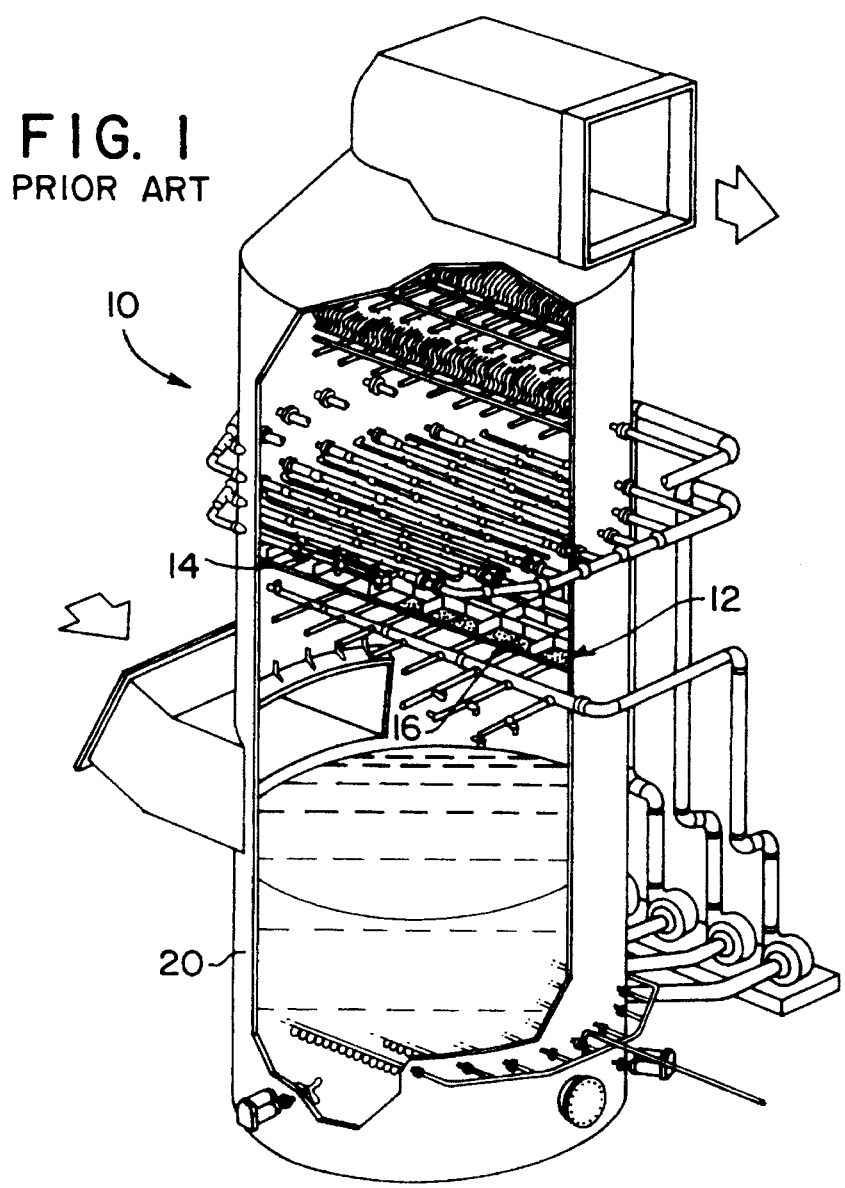
FIG. 1 is an isometric view of a prior art wet FGD spray tower using separate spray headers and baffled trays spaced therefrom.

The perforated plate 24 has an optimum open area design shown at 34 such that a balance is achieved to minimize gas side pressure drop and maximize pollutant removal. The integrated tray/spray header arrangement can also be used for each and every spray level (elevation) shown in FIG. 1. Optimization of the integrated tray/spray header arrangement allows variables such as: cost, slurry/liquid side pressure drop, gas side pressure drop, open area, nipple design, etc., to achieve the most efficient performance in terms of removal efficiencies, installation and operational costs.

Figure 5:
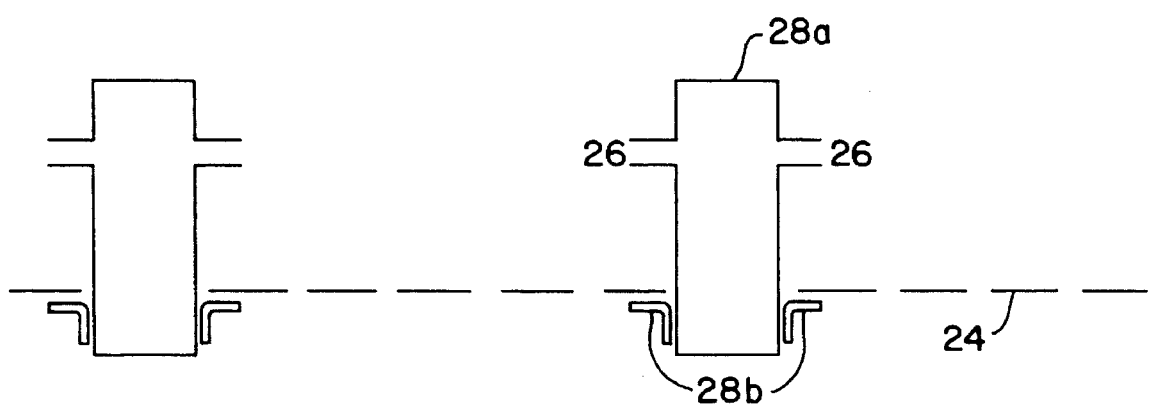
FIG. 5 is a side view of an alternate embodiment.

Another embodiment of the invention would allow the support beam to act as a support structure and an integrated header (FIG. 5). In this embodiment, a box beam 28a normally used to support the absorber internals is used as a header to deliver the reagent to the nozzle 26 and the tray 24. Nozzles 26 are attached to the sides of the box beam 28a and spray horizontally in a direction perpendicular to the gas flow. A shelf 28b attached to the box bream supports the tray sections.

From the foregoing, it is thus seen that the advantages of the present invention include but are not limited to:
1. Reduced support engineering, material, fabrication and erection costs as a result of shared structural support and functional design aspects.
2. Eliminate the typical high pressure absorber spray nozzles. The invention utilizes turbulence to produce an effective liquid surface area sufficient for adequate removal of acid gases, particulates and other contaminants. The nozzle design utilizes low pressure drop pipe nipples. Such a design significantly reduces the problems of high pressure nozzle spray impingements and more importantly the pumping energy required to supply the recirculated slurry/liquor.

3. Applicability is enhanced with respect to high velocity absorber designs. The nature of the forces which influence the turbulent zones across the surface of this tray/header design lend themselves to higher gas velocity designs. The higher gas velocities improve the performance of the design, while the design itself helps to limit the adverse droplet loading to the mist eliminators by confining the turbulent spray zone and limiting the production of fine droplets.
4. Reduce capital costs through the elimination of costly spray nozzles and their attachment methods.
5. Facilitates interspatial header designs.
6. Engineering man hour savings in terms of typical spray nozzle layout concerns including; spray coverage, spray to absorber wall impingement, spray to header support impingement, etc.

While specific embodiments of the invention have been shown and described in detail to illustrate the application of the principles of the invention, it will be understood that the invention may be embodied otherwise without departing from such principles. As an example, the design could include the following modifications:

1. The headers could extend clear through the tower and act as the support members for themselves and the tray.
2. Header nozzles could be altered in terms of direction, sizing, and/or inclusion of end-caps or low pressure spray nozzles, for enhanced performance.
3. A pseudo interspatial/interlaced header system could lay directly on top, and be supported by the first set of headers which lay directly on the tray surface. This second header system could be oriented perpendicular to the first header system, or at some other angle.

We claim:

1. An integrated spray header and perforated tray system for a wet FGD spray tower, comprising:
   a perforated plate;
   a plurality of headers spaced on said plate extending along said plate to rest thereon;
   a plurality of baffles spaced on said plate and extending along said plate in substantially perpendicular relationship to said headers to form along with said plate and headers a perforated tray for a spray tower; and
   spray means for allowing desulfurizing spray along said tray from said headers.

2. An integrated system as set forth in claim 1 further comprising support means for supporting said plate and said headers in the spray tower.

3. An integrated system as set forth in claim 2 wherein said support means includes a plurality of I-beams located along the length of said plurality of headers and located on an under side of said plate below said headers.

4. An integrated system as set forth in claim 1 wherein said spray means includes a plurality of discharge ports located on opposite sides of each of said spray headers to discharge desulfurizing slurry substantially parallel to said plate.

5. An integrated system as set forth in claim 4 wherein each of said plurality of baffles to comprise a notch constructed to extend over or under said plurality of headers and to touch said plate thereby.

6. A wet FGD spray tower comprising: an absorber tower having a flue gas inlet in a bottom thereof and a flue gas outlet at a top thereof;
   a perforated plate located in said tower between the flue gas inlet and outlet thereof to allow flue gas to flow through the perforations in said plate;
   a series of spray headers each having discharge ports for discharging a slurry therefrom located along said perforated plate and resting thereon; and
   support means for supporting said perforated tray and said series of spray headers located thereon to said spray tower.

7. A tower as set forth in claim 6 wherein said support means includes a plurality of I-beams located along the length of said plurality of headers and located on an under side of said plate below said headers.

8. A tower as set forth in claim 7 wherein the spray nozzles of said series of spray headers comprises a plurality of spray nozzles located on opposite sides of each of said spray headers to spray slurry substantially parallel to said plate.

9. A tower as set forth in claim 8 further comprising a plurality of baffles in substantially perpendicular relationship to said series of spray headers.

10. A tower as set forth in claim 9 wherein each of said plurality of baffles further comprises a notch constructed to extend over said plurality of headers and to touch said plate thereby.

11. A tower as set forth in claim 7, wherein the spray nozzles of said series of spray headers are positioned to spray slurry substantially normal to said plate.

12. An integrated system as set forth in claim 1, wherein said spray means includes at least one discharge port located substantially perpendicular to said plate to spray slurry substantially perpendicular thereto.

* * * * *